United States Patent [19]

Cusack

[11] 4,121,211

[45] Oct. 17, 1978

[54] METHOD AND APPARATUS FOR DETERMINING A SIGNAL OF UNIFORM PERIOD

[75] Inventor: Joseph Martin Cusack, Plainsboro, N.J.

[73] Assignee: RCA Corporation, New York, N.Y.

[21] Appl. No.: 822,210

[22] Filed: Aug. 5, 1977

[30] Foreign Application Priority Data

Nov. 22, 1976 [GB] United Kingdom ............... 48630/76
Jul. 26, 1977 [GB] United Kingdom ............... 31377/77

[51] Int. Cl.² .............................................. G01S 9/24
[52] U.S. Cl. ...................................... 343/14; 324/78 Z
[58] Field of Search .............. 324/78 Z, 83 D; 343/14

[56] References Cited

U.S. PATENT DOCUMENTS 3,699,949 10/1972 O'Hanlon, Jr. et al. ...... 324/78 Z X
4,031,464 6/1977 Norberg .............................. 324/78 Z

FOREIGN PATENT DOCUMENTS 2,245,723 4/1973 Fed. Rep. of Germany ........ 324/78 Z Primary Examiner—T.H. Tubbesing
Attorney, Agent, or Firm—H. Christoffersen; Joseph D. Lazar; Raymond E. Smiley

[57] ABSTRACT

The periods of several successive cycles of an alternating signal are determined and used to calculate the value corresponding to the statistical variance thereof. The deviation value is compared with a preselected value corresponding to the maximum variance expected of an alternating signal with a substantially uniform period. If the preselected value exceeds the computed value, an alternating signal with a uniform period is present while if the computed value exceeds the preselected value an alternating signal with a non-uniform period is present.

6 Claims, 4 Drawing Figures

METHOD AND APPARATUS FOR DETERMINING A SIGNAL OF UNIFORM PERIOD

The Government has rights in this invention pursuant to Contract No. DOT-HS-5-01215, awarded by the Department of Transportation.

BACKGROUND OF THE INVENTION

In some systems, such as a frequency modulated-continuous wave (FM-CW) ranging radar, typically, a simple sinusoidal signal is produced and processed in some desired way. Under certain circumstances, a complex waveform signal may be produced which signal may be, for example, the combination of two or more simple sinusoidal signals. Such a complex signal may require different processing than does the simple sinusoidal signal or may not be capable of being processed depending on the nature of the processing equipment.

Thus, for example, in the aforementioned radar system having, for example, a triangular modulating waveform wherein one target is present in the radar illumination beam, simple sinusoidal beat frequencies, created by mixing the target illuminating interrogation signal with the signals, reflected from the target, associated respectively with the upswing and downswing portions of the modulating waveforms, are produced from which range and range rate may easily be determined. However, if two or more targets are present in the illumination beam, or if multiple return signals from one target exist, the resultant beat frequency is typically a complex waveform resulting from the combination of the simple sinusoidal beat frequency waveforms associated with each target or from the multiple paths of return from the single target. Further, it has been found that, under some circumstances, the radar will receive a return signal from a first target on one modulation cycle and a return signal from a second target on a subsequent modulation cycle. Therefore, the resulting beat frequencies will be simple sinusoids on each modulation cycle, but the frequency will vary from modulation cycle to modulation cycle. A complex beat frequency or beat frequency that varies from one modulation cycle to another, typically cannot be properly processed by the rather unsophisticated processing equipment typically found in such radar systems. Therefore the presence of such complex waveforms must be detected so that they are not erroneously processed.

SUMMARY OF THE INVENTION

An apparatus and method are claimed for distinguishing an alternating signal having a substantially single period from an alternating signal for which successive cycles have different periods. In accordance with the apparatus of the invention, means are responsive to the alternating signal for determining the values, $X_i$, corresponding to the periods of $n$ successive cycles where $1 \leq i \leq n$ and $n$ is an integer greater than one, means for determining a value, Y, corresponding to the standard deviation of the $n$ values of $X_i$ and a means comparing the value Y with a preselected value Z representing the maximum standard deviation expected of said alternating signal having said substantially single period for producing a signal indicative of whether Z is the greater number indicating that an alternating signal having a single period is present or whether Y is the greater number indicating that a signal having different periods is present.

The method of the invention comprises the steps of determining the $n$ values, $X_i$, corresponding to the periods of $n$ successive cycles of the alternating signal where $i$ and $n$ are as stated above, computing the value of Y corresponding to the standard deviation of the $n$ values of $X_i$ and comparing the value Y against the preselected value Z as stated above for the apparatus.

DETAILED DESCRIPTION OF THE PREFERRED EMBODIMENT

Figure 1:
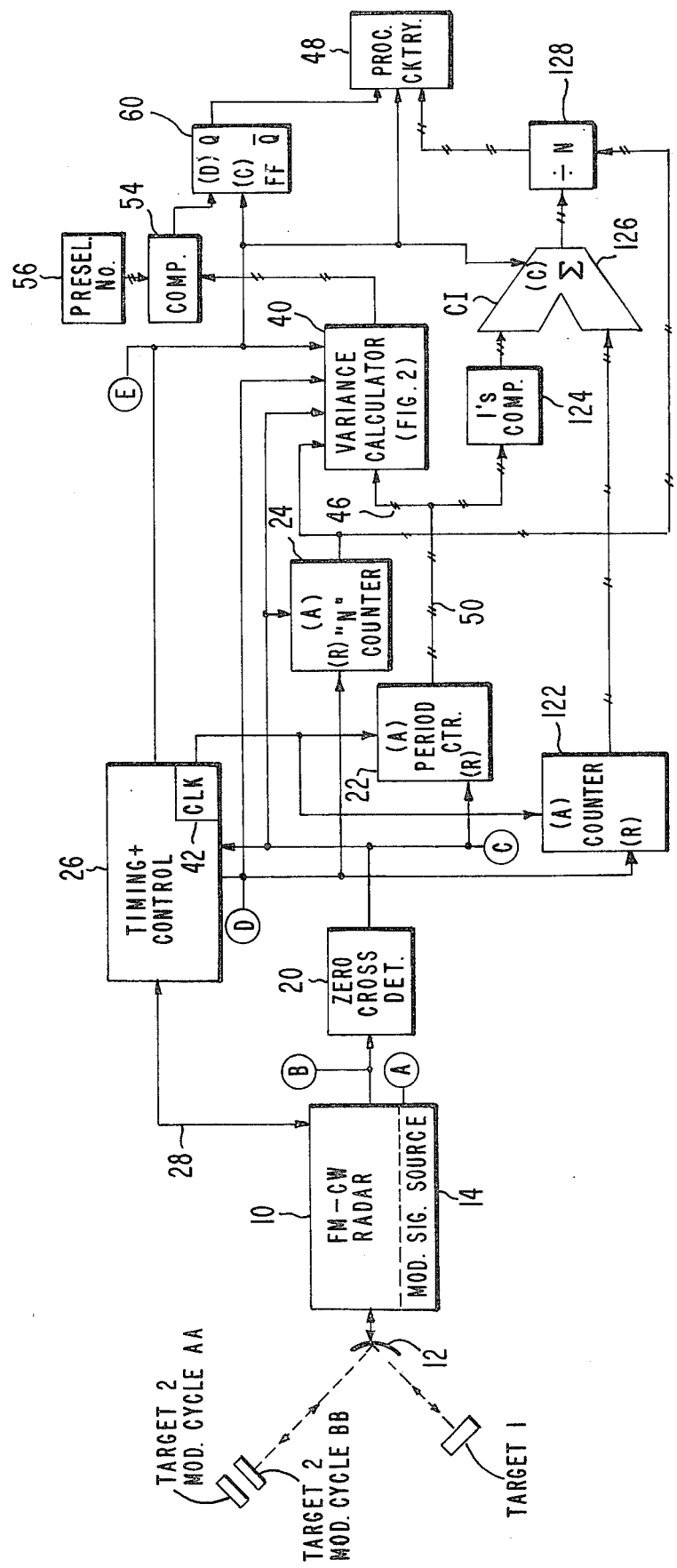
FIG. 1 is a radar ranging system incorporating the present invention.

Referring now to FIG. 1, an FM-CW radar 10 is shown coupled to an antenna 12. The antenna 12 directs a continuous wave signal, modulated in accordance with a triangular waveform provided by modulation signal source 14 suitably included with radar 10, toward distant objects, such as, for example, Target 1. The return signal from any objects illuminated by the beam from antenna 12 is mixed with the emitted signal and a resultant alternating beat frequency signal is generated which correlates to the range and range rate of an object or objects from radar antenna 12. As an example, one such FM-CW radar suitable for use as radar 10 is described in U.S. Pat. No. 4,003,049, issued Jan. 11, 1977, to F. Sterzer, et al.

Figure 3:
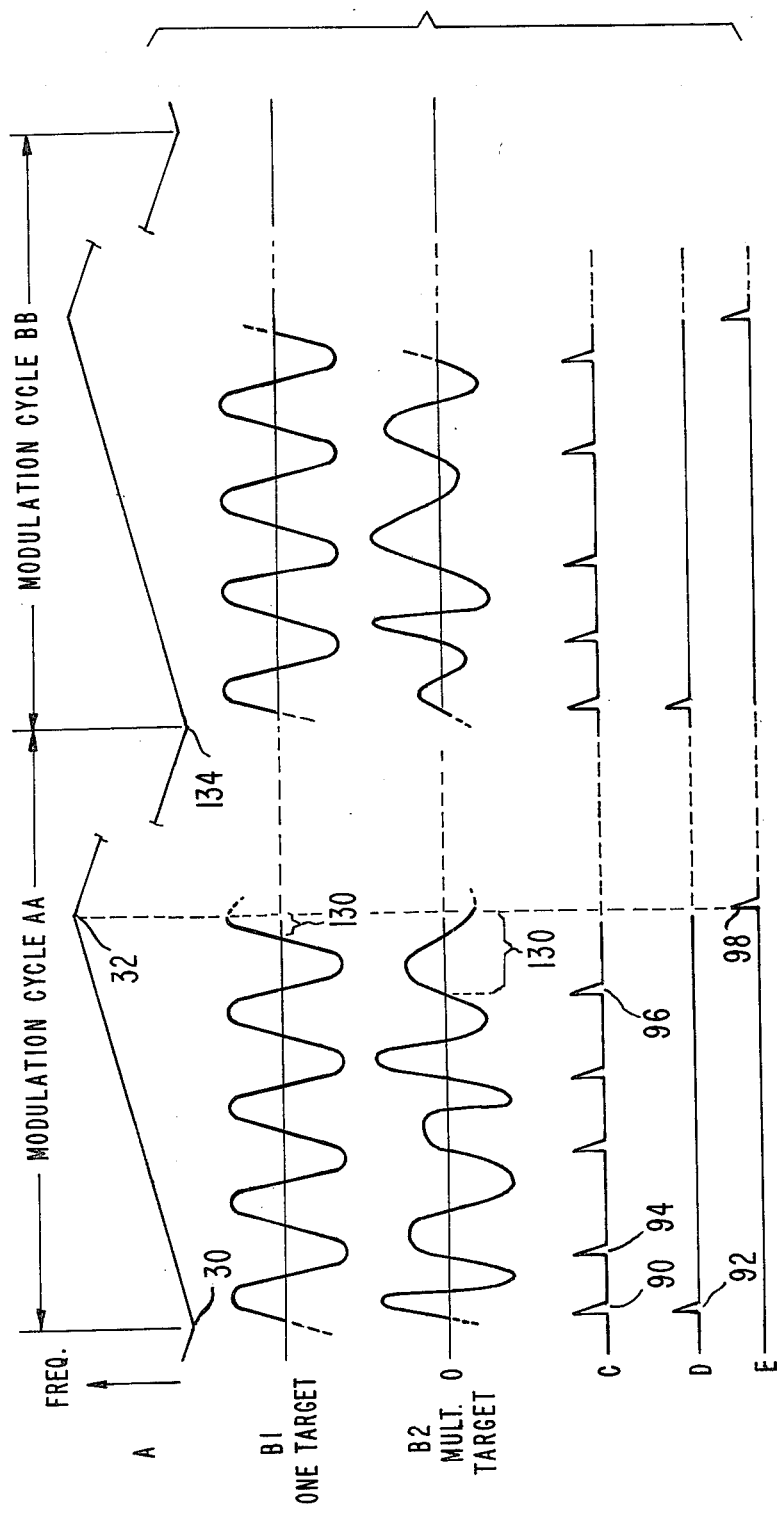
FIG. 3 is a set of waveforms useful in understanding the operation of the apparatus of FIG. 1.

Ideally, the waveform produced by radar 10 at terminal B is of the form illustrated in FIG. 3, waveform B1, for one target; that is, a pure sine wave. Unfortunately, occasionally due to any one of a number of causes, such as returns from multiple targets (such as Target 1 and Target 2 in FIG. 1) or so-called multipath returns in which return signals from the radar take more than one path, a complex waveform may be produced by radar 10 at terminal B such as that shown in waveform B2, FIG. 3 for multiple targets. As will be described more fully, hereinafter, signals such as waveform B2 for multiple targets cannot be processed by the radar system processing equipment and therefore must be detected and flagged.

In FIG. 1, radar 10 is coupled to a zero crossing detector 20 which may be any of a number of commercially available zero crossing detectors. Zero crossing detector 20 is arranged to provide pulses indicative of crossings of the waveform from a point below some reference value (which may be ground or some positive or negative value) to a point above that reference value, or vice versa. Alternatively, the zero crossing detector may be arranged to detect both positive and negative crossings of a reference value or to detect crossings at some point removed from (i.e., above or below) ground to prevent unwanted detection of noise, which often occurs at approximately ground level. For purposes of this description, however, detector 20 will be assumed to detect positive going transitions only relative to reference ground. The output terminal, C, of zero crossing detector 20 is coupled to the reset (R) terminal of counter 22, to the advance (A) terminal of a counter 24, as a timing input to timing and control means (TC) 26 and to variance calculator 40 (of which more will be described in connection with a description of FIG. 2).

A line 28 coupling radar 10 to TC 26 provides information to TC 26 as to the turnaround points, positive and negative directed, of the modulating signal from source 14. See, for example, points 30 and 32, FIG. 3 waveform A to be described further. Terminal D from TC 26 is coupled to the reset (R) terminal of counter 24, to variance calculator 40 and to (R) terminal of counter 122. TC 26 produces a pulse at terminal D marking the ocurrence of the first pulse from zero crossing detector 20 after each occurrence of a turnaround of modulating signal A (FIG. 3). The pulse at terminal D resets counters 24 and 122 and resets variance calculator 40 to accept input data for calculation of the variance thereof.

As is well known to those skilled in the art, beat frequency waveform B (B1 or B2), FIG. 3, suffers an undesired perturbation at the turnaround points (30, 32) of modulating signal, waveform A. It is therefore common practice to blank the beat frequency waveform for a preselected time at each turnaround point such that TC 26 produces a pulse at terminal D corresponding to the first zero crossing following the blanking period of waveform B.

A high frequency clock pulse means 42, which is suitably a part of TC 26, is coupled to the respective A terminals of counters 22 and 122. The combination of clock 42 and counter 22 is thus a high speed timing device for producing a number indicative of the time lapse between reset pulses from zero crossing detector 20 and therefore the time lapse between cycles of waveform B (B1 or B2) received at the input terminal of zero crossing detector 20. By way of example, assume an alternating signal applied to zero crossing detector 20, which has a period of one second (actual signals produced by radar 10 it should be understood have periods in the order of nanoseconds) and further assume clock 42 produces a pulse every 100th of a second. Accordingly, the count in counter 22 will reach 100 before being reset by a pulse from zero crossing detector 20.

Counter 22 is coupled by a multiconductor cable 46 to variance calculator 40 and to a one's complement circuit 124. (All multiconductor cables such as cable 46 are indicated as such by cross hatch lines 50.) The output of variance calculator 40 is coupled to a comparator means 54. Also coupled to comparator 54 is a means, such as means 56, providing a preselected number enabling comparator 54 to compare the number produced by calculator 40 to the preselected number produced by device 56. An output terminal E of TC 26, which is adapted to produce an output pulse marking the turnaround points of waveform A, is coupled to both the variance calculator 40 and the clock terminal of a D-type flip-flop 60. The output terminal of comparator 54 is coupled to the D terminal of flip-flop 60. The condition of flip-flop 60 (set or reset) is dependent upon whether in the last comparison in comparator 54, the number in means 56, is the greater number or whether the number produced by variance calculator 40 is the greater number.

One's complement circuit 124 and counter 122 are coupled to respective input terminals of summing means 126 which also has the value 1 permanently wired to the C1 terminal thereof. The output terminal of summing means 126 is coupled to divide-by-N circuit 128 which is in turn coupled to processing circuitry 48. Counter 24 is coupled to circuit 128 to supply the value N. Summing means 126 effectively subtracts the value in counter 22 from the value in counter 122 when a pulse from terminal E, TC 26 is applied at the clock (C) terminal thereof.

The Q output terminal of flip-flop 60 is coupled to a control terminal of processing circuitry 48. Processing circuitry 48 may be of the type exemplified by U.S. Pat. No. 3,968,492 issued July 6, 1976 to G. S. Kaplan. Circuit 48 utilizes information it receives from summing means 126 to ascertain the range and/or range rate of a single target from radar unit 10. Circuit 48, however, in typical form processes signals from only a single target at a time and cannot properly process the data it receives in those situations where multiple targets are present or other conditions are present which cause a complex waveform, such as waveform B2, for multiple targets in FIG. 3 to exist. Variance calculator 40 will determine the existance of such complex waveforms as described below and flip-flop 60 will be set to a condition such as to inhibit the passage of signals from circuit 128 to processing circuitry 48.

Variance calculator 40 is adapted to calculate the variance of numbers it receives from counter 22. In general, variance ($\sigma^2$) may be represented by the following equation:

$$\sigma^2 = \sum_{i=1}^{N} \left[ \frac{(X_i - X)^2}{N} \right] \quad (1)$$

where $$X = \sum_{i=1}^{N} \left[ \frac{X_i}{N} \right], \quad (2)$$

$N$ = an integer to the number of samples $X_i$ taken,
$\sigma$ = the statistical standard deviation.

A substitution of equation two into equation one and rearrangement of terms yields $$\sigma^2 = \frac{\sum_{i=1}^{N} X_i^2 - \left( \sum_{i=1}^{N} X_i \right)^2 / N}{N} \quad (3)$$

In the case of the apparatus illustrated in FIG. 1, $X_i$ is equal to the count reached in counter 22 before being reset which corresponds to the period of each cycle of the signal produced at radar 10 terminal B, while N is the count reached in counter 24 when it produces its output pulse.

Figure 2:
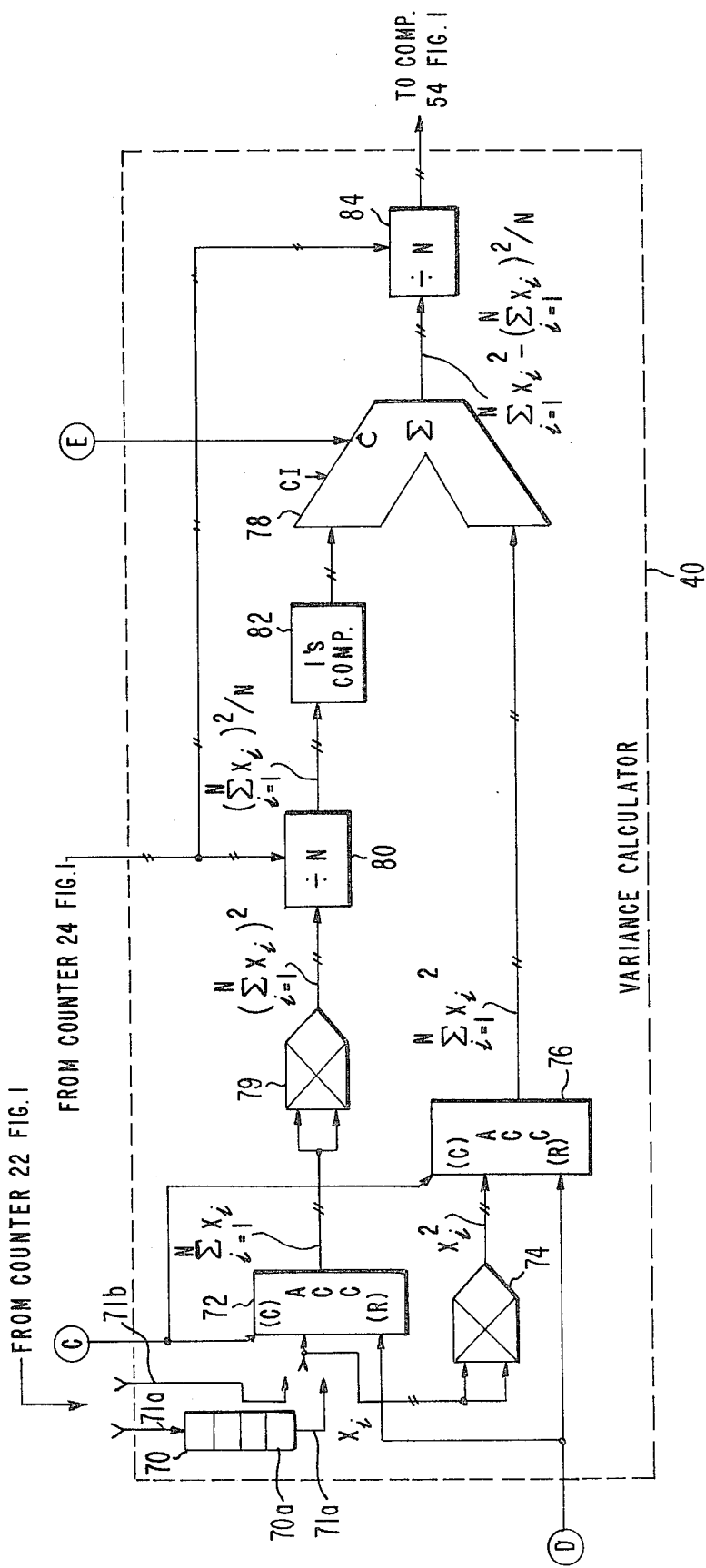
FIG. 2 is a variance calculator in block diagram form suitable for use in the radar system of FIG. 1.

Variance can be computed by a properly programmed digital computer or by a hardwired logic such as that illustrated in FIG. 2 to which attention is now directed. The output of counter 22 (FIG. 1) is alternatively coupled via path 71a through a segmented buffer storage means 70 to an accumulator 72 and to two inputs of a multiplier 74 or is coupled directly, via path 71b, to accumulator 72 and multiplier 74.

Means 70 is utilized if the variance calculator cannot process data as fast as it is received from counter 22. If the variance calculator can process the data as fast as it is received from counter 22, storage means 70 may be eliminated. Segmented storage means 70 is a type of storage which is adapted to receive signals at its input at one rate and to emit the signals, in the order received, at its output at a second rate which may or may not be equal to the first rate. One device ideally suited to this usage is the RCA model CD40105B COS/MOS "First-In-First-Out Register."

A digital accumulator such as 72 is an operating device for adding an input digital signal to a stored digital signal in response to a control or clocking pulse. The output signal from the accumulator is the stored digital value, which is increased at each clocking pulse by an amount equal to the input signal. An accumulator can be assembled from commercially available devices. For example, an arithmetic-logic unit (ALU) such as an integrated circuit type SN74181 (Texas Instruments, Inc.) can be coupled to receive at one set of input terminals the input digital signal and, at the other set of input terminals, the stored digital signal. The output signals from such an ALU can be coupled such that each of the respective signals is coupled to a D-input terminal of a separate D-type flip-flop, each clock input signal of the flip-flops being coupled in common to the control or clocking pulse. Integrated circuits having a plurality of flip-flop stages with common clock signals are commercially available, e.g., type SN7475 (four stages) or SN74100 (eight stages) (Texas Instruments, Inc.). The output signals from the flip-flops are the stored digital value. The devices described can be cascaded to form digital words of any desired number of bits. For $n$ bits (stages), addition (or subtraction) is performed modulo $2^n$, but an overflow or carry signal is provided when the ALU output value exceeds $2^n - 1$.

Multiplying two digital (binary) numbers such as done in device 74 can be performed sequentially or combinatorially using cascaded logic networks. The sequential technique is well known and described in the literature. (See, for examples, *Digital Computer and Control Engineering*, R. S. Ledley, McGraw-Hill Book Co., Inc., 1960, esp. Chapters 15 and 16; and *The Logic of Computer Arithmetic*, I. Flores, Prentice-Hall, Inc., 1963, Chapters 3, 8–11.) The use of combinatorial networks is also well known and, though usually requiring more hardware, produces the desired result after the propagation delays of the network gates. (See, for examples, "Multiplying Made Easy for Digital Assemblies" by C. Ghest, *Electronics*, Nov. 22, 1971, pp. 56–61; and "Parallel Multiplier Gets Boost from IC Iterative Logic" by J. Springer and P. Alfke, *Electronics*, Oct. 12, 1970, pp. 89–93.)

In the arrangement shown, accumulator 72 produces the sum of the values $X_i$ received at its input terminal. Multiplier 74 squares the value of $X_i$ received at its input terminals and applies this result to a second accumulator 76 identical to accumulator 72. Accumulator 76 sums the squared values of $X_i$ received at its input terminal and applies its results to a summing means 78. The output terminal of accumulator 72, which is the sum of the $X_i$ received at its input terminal, is applied to a multiplier 79 identical to multiplier 74. Multiplier 79 computes the square of the sum of the $X_i$'s produced by accumulator 72 which value is divided by N in a divide-by-N circuit 80. The divide-by-N circuit 80 is coupled to a one's complement circuit 82.

The output of the one's complement circuit 82 is coupled to summing means 78. A permanent carry-in signal of value 1 is supplied at the CI terminal of summing means 78 while terminal E (TC 26) FIG. 1, is coupled to the C terminal thereof. Because the value produced by divide-by-N circuit 80 is complemented, the net effect is that the value is subtracted by summing means 78 from the value produced by accumulator 76. The output of summing means 78 is the sum of $X_i^2$ minus the square of the sum of $X_i$'s divided by N. This number is divided by N in divide-by-N circuit 84 producing the results of equation (1) supra and then applied to comparator 54 (FIG. 1). The D output terminal of TC 26, FIG. 1, is coupled to the reset (R) terminals of accumulators 72 and 76 to reset them at the beginning of each variance calculation cycle.

If optional segment buffer register means 70 is not provided, clocking of accumulators 72 and 76 is provided from the output of zero crossing detector circuit 20. If buffer register means 70 is provided, then timing to accumulators 72 and 76 may be provided by a signal generated within means 70 indicative of data in the output stage 70a thereof.

Operation of the apparatus of FIGS. 1 and 2 will now be described with the assumption that a beat frequency waveform of unknown type (substantially uniform period or nonuniform period), but assumed nevertheless for description purposes to have five positive going zero crossings within one modulation half cycle, negative to positive, is being produced at terminal B of radar 10. Counters 22 and 122 are continuously counting at a rate set by clock 42. At the time that the first positive going zero crossing of waveform B (B1 or B2) is detected by detector 20, following a turnaround of modulating waveform A (FIG. 3), a pulse 90 (waveform C, FIG. 3) is produced. Pulse 90 resets counter 22 and is also provided to TC 26. TC 26 contains suitable control logic elements such as flip-flops and AND gates which determine that pulse 90 corresponds to the first zero crossing following the turnaround of modulating waveform A (FIG. 3) from negative going to positive going and issues a pulse 92 at terminal D. Pulse 92 resets both N counter 24 and counter 122 (FIG. 1) to a count of zero and resets variance accumulators 72 and 76, (FIG. 2) to a zero condition thus conditioning variance calculator 40 to perform a variance calculation as hereinafter described.

After pulse 90 resets counter 22 and after pulse 92 resets counter 122, the counters begin to count in accordance with pulses received from clock source 42 until zero crossing detector 20 produces a pulse 94 indicating the next positive going zero crossing of waveform B (B1 or B2). Pulse 94 of waveform C (FIG. 3) advances counter 24 to a count of one, resets counter 22 and clocks the value contained in counter 22 and the square of that value into accumulators 72 and 76 (FIG. 2), respectively. The operation just described is repeated four more times (since a total of five zero crossings corresponding to four successive periods of waveform B (B1 or B2) has been assumed) until finally zero crossing detector 20 produces pulse 96 (waveform C, FIG. 3) marking the fifth negative to positive zero crossing to waveform B (B1 or B2). Pulse 96 advances counter 24 to a count of four which value is passed to divide-by-N circuits 80 and 82. Pulse 96 also clocks accumulators 72 and 76 such that the value contained in the counter 22 is entered into accumulator 72 and the square of that value is entered into accumulator 76. Pulse 96 also resets counter 22 which again begins to advance in accordance with pulses from clock 42.

At this point in time, accumulator 72 contains the sum of values representing four successive periods of waveform B (which, B1 or B2, is not known at this time) while multiplier 79 is producing the square of the sum stored in accumulator 72 and divide-by-N circuit 80 produces a value representing the sum squared value divided by four (the value contained in counter 24). At the same point in time, accumulator 76 contains the sum of the squares of the values representing four successive periods. The sums produced respectively by circuit 80 as complemented in one's complement circuit 82 and by accumulator 76 are applied to summing means 78.

At the next turnaround point 32 of waveform A (FIG. 3), pulse 98 occurs to clock summing means 78 of variance calculator 40 which along with divide-by-N counter 84 performs the variance calculation indicated in formula (3), supra, and provides the value so obtained to comparator 54, FIG. 1. When the variance signal is applied to comparator 54, comparator 54 makes the comparison between the value computed by variance calculator 40 with a preselected number as set in device 56. The number in device 56 is chosen to equal the maximum variance value of a substantially uniform period waveform B1. Pulse 98 also clocks flip-flop 60 to accept an indication from comparator 54 whether the preselected number exceeds the number from variance calculator 40 or vice versa. If the preselected number exceeds the number in variance calculator 40, waveform B1 is present. Then the signal from comparator 54 sets flip-flop 60 to a condition such that processing circuitry 48 is conditioned to accept the value computed in circuit 128. In contrast, if the value in variance calculator 40 exceeds the preselected number in device 56, which indicates that a waveform B2 of nonuniform period is present, implying a multiple target situation or other anomaly as previously described, the output signal from comparator 54 conditions flip-flop 60 to a condition such that the processor is not receptive of information from circuit 128 and effectively shuts down its processing until such time as a waveform with uniform period is received at terminal B of radar 10.

The period of uniform waveform B1 is computed as follows. At turnaround point 32 of waveform A (FIG. 3), when pulse 98 (waveform E) occurs, counter 122 contains a count value corresponding to four periods of waveform B1 (FIG. 3) plus an addition count corresponding to portion 130 of waveform B1. Portion 130 is the portion of waveform B1 which extends between the last negative to positive zero crossing of waveform B preceding turnaround point 32 of waveform A. At turnaround point 32, counter 22 contains a count value corresponding to portion 130 of waveform B1. Therefore, at point 32 when pulse 98 is produced at terminal E of TC 26 and applied to summing means 126, the difference in values of counters 122 and 22 is produced, which corresponds to the four full periods of waveform B1 (FIG. 3). This number, when divided by N, the count contained in counter 24, is the average period of waveform B1. It should be noted that for a uniform waveform B1, the period of the waveforms correspond directly to the maximum count reached in counter 22. Therefore, counter 122, one's complement circuit 124 and summing means 126 are not needed. However, in representing an analog signal such as waveform B (B1 or B2) by a digital value such as stored in counter 22, an error occurs, which error is known as the "quantization error," such that the number contained in a counter may misrepresent by a count of one, the analog signal to which it corresponds. It is better to have this count of one quantization error spread over several (e.g., four) cycles of beat frequency waveform B (B1 or B2) rather than over only one cycle.

A number of alternatives to the system just described, may be successfully utilized depending on the situation. Thus, for example, zero crossing detector 20 may detect both positive and negative zero crossings in which case the value N may be double that utilized in the above described operation.

As described above, in the situation of multiple targets, it has been noted that on one modulation cycle, such as for example waveform A, modulation cycle AA, a simple sine wave corresponding to a first target occurs while for a subsequent modulation cycle (for example waveform A, modulation cycle BB), another simple sine wave, at a totally different period may occur corresponding to the second target. In such a case, computing a variance or standard deviation on only one modulation cycle would not detect the presence of a two target situation. Calculating the variance of waveforms received over several modulation cycles requires modification of the circuit of FIG. 1.

Figure 4:
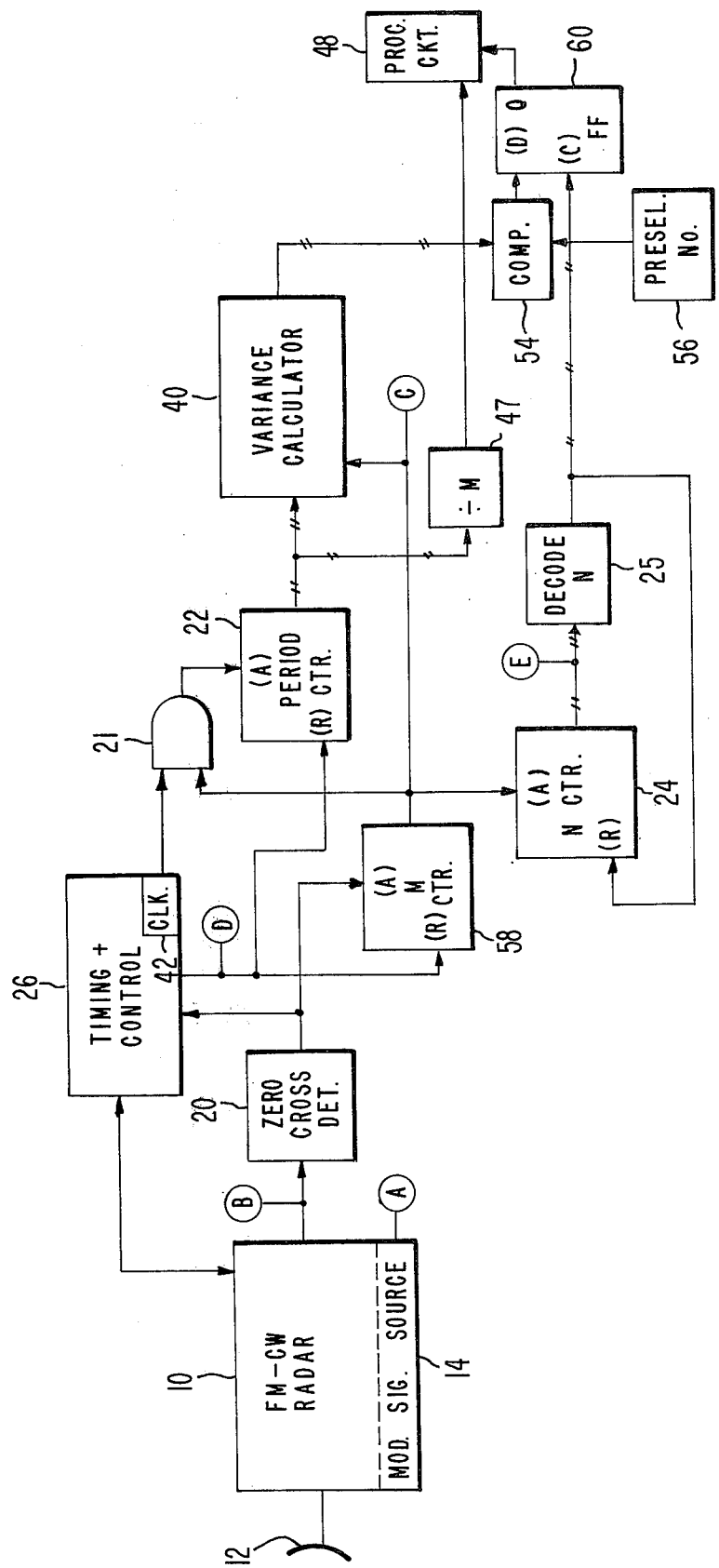
FIG. 4 is another radar ranging system incorporating the present invention.

Such modification is illustrated in FIG. 4 to which attention is now directed. Zero crossing detector 20 is coupled to the advance terminal of a new M stage counter 58. M stage counter 58 counts the number of zero crossings of beat frequency waveform B (B1 or B2) (FIG. 3) negative to positive, positive to negative or both, and when that count has reached a preselected value, M, counter 58 produces a pulse at its output terminal C. The signals produced at terminal C FIG. 4 do not correspond to those produced at terminal C FIG. 1 as illustrated in waveform C, FIG. 3. However, terminal C FIG. 4 is tied to terminal C of variance calculator 40 FIG. 2. A method by which M is determined is described in the aforementioned U.S. Pat. No. 3,968,492 to Kaplan. Terminal C of counter 58 is coupled to the advance (A) terminal of counter 24, to one input terminal of an AND gate 21 and to the clock terminals of accumulators 72 and 76 (FIG. 2). Clock source 42 within TC 26 is coupled to the second input terminal of AND gate 21, the output terminal of which is coupled to the advance terminal of counter 22. The D terminal of TC 26 is coupled to the reset (R) terminals of counters 22 and 58. Counter 24 counts the number of modulation cycles received, the value of which is produced at its output terminal E. Output terminal E of counter 24 is coupled to a decode N circuit 25 which produces a pulse when counter 24 reaches a preselected count of N. Circuit 25 is coupled to the clock terminal of flip-flop 60 and to the own reset terminal of N counter 24. The value N will be selected on the basis of engineering judgement considering the following. A relatively large value of N provides a greater likelihood of accurately determining the uniformity (or lack of it) of beat frequency waveform B (B1 or B2). A relatively smaller value of N insures that results will be available sooner in processing circuitry 48.

Operation of the apparatus of FIG. 4 is similar to the operation of the apparatus of FIG. 2. The differences will be described briefly. It will initially be assumed that counter 24 is at a count of zero and the modulating waveform A is at a negative to positive going turnaround point such as point 30 (FIG. 3). Thereafter, the first zero crossing of the beat frequency waveform B (B1 or B2) causes TC 26 to produce a pulse at terminal D such as 92 (FIG. 3), which resets counters 22 and 58. With counter 58 reset to any count other than M, it produces a signal of a polarity such as to prime, AND gate 21 to accept clock pulses from clock source 42. At each zero crossing, zero crossing detector 20 produces a pulse which advances M counter 58 until some preselected number of zero crossings representing M cycles of the beat frequency, waveform B (B1 or B2), has occurred. When M counter 58 reaches a count of M, it produces an output signal at terminal C, the leading edge of which clocks the value contained in counter 22 (a number representing the period of M cycles of beat frequency) into variance calculator 40. The polarity of the signal produced by counter 58 when it reaches a count of M is such as to disable AND gate 21 so period counter 22 stores its count. Also, the leading edge of the signal from M counter 58 advances N counter 24 to a count of 1. No activity then occurs in the circuit of FIG. 4 until the next negative to positive going turnaround point 134 of waveform A (FIG. 3) occurs followed by the first zero crossing at which time a pulse at terminal D occurs to reset M counter 58 and period counter 22 to counts of zero. As is well known to those skilled in the art of FM-CW radar, the period of the beat frequency corresponding to the positive directed half of the modulating waveform will be different from the period of the beat frequency corresponding to the negative directed half of the modulating waveform in the case of moving targets. Therefore, the variance calculation must be performed only on data associated with positive or negative portions of the modulating frequency but not both.

The operation just described then continues until counter 24 reaches a count of N representing N modulation cycles at which time a pulse is produced at terminal E of decode N circuit 25. (Waveform E, FIG. 3, does not apply to signals produced at terminal E, FIG. 4.) The resulting pulse from circuit 25 activates summing means 78 (FIG. 2) to complete the variance calculation and clocks flip-flop 60 to set or reset in accordance with the comparison in comparing means 54 of the number computed in variance calculator 40 with the preselected number in device 56. It should be noted that when circuit 25 produces a pulse indicating N modulation cycles have been received, period counter 22 contains a number representing M periods. Then a divide-by-M device 47, positioned between counter 22 and processing circuitry 48, provides to processing circuit 48 a count representing a single period of beat frequency.

It should be understood that alternating signals from sources other than radar units may be utilized as inputs to the variance calculator 40 and associated circuits just described. Accordingly, the invention is useful in an environment wherein a waveform having differing periods is to be distinguished from a waveform having a uniform period. The alternating signal may be of any form such as a square wave, a triangle wave, a sawtooth wave, or any other wave which periodically or aperiodically passes through some reference level.

It will be appreciated that in a situation with a moving target relative to radar antenna 10, half-period successive portions or periods of beat frequency waveform B1 will differ slightly from one another, but will be substantially uniform over a few periods of modulation waveform A, FIG. 3. Preselected number circuit 56 is simply set to a value consistent with a variance calculated for periods which do differ slightly from one another.

In other applications, an alternating signal consisting essentially of uniform periods may have a relatively small number of periods which acceptably vary from the uniform periods. Again, the value in circuit 56 is set accordingly to be greater than the variance of such an alternating waveform, allowing flip-flop 60 to become set for processing circuitry 48 to process data received thereat.

What is claimed is:

1. Apparatus responsive to any input alternating signal having at least N periods to determine whether said signal has portions consisting essentially of an alternating signal of substantially uniform period, where N is an integer greater than one, comprising in combination:
    means responsive to said input signal for determining the values, $X_i$ corresponding respectively to the lengths of said periods where $i = 1, 2, \ldots N$;
    means for determining a value, Y, corresponding to the variance of the N values of $X_i$; and
    means comparing said value Y with a preselected value Z representing the maximum variance of said uniform period alternating signal for producing a first signal indicative of Z being the greater number manifesting thereby that said input signal consists essentially of an alternating signal of substantially uniform period and for producing a second signal indicative of Y being the greater number manifesting thereby that said input signal does not consist essentially of said substantially uniform period signal.

2. The combination as set forth in claim 1 further including means providing said input alternating signal comprising an FM-CW radar of the type which is responsive to a target signal for producing a beat frequency signal which is said input signal.

3. The combination as set forth in claim 1 wherein said means for determining values $X_i$ comprises means for producing a signal marking the time of crossing of said input alternating signal through a reference level, means producing periodic pulses having a period much smaller than said periods to be determined, and counter means responsible to said periodic pulses for counting the same and responsive to said marking signal for becoming reset, wherein the maximum count reached in said counter before being reset is said value $X_i$.

4. The combination as set forth in claim 1 wherein said apparatus further includes means responsive to said means for determining the values $X_i$ and responsive to said first signal for processing said values $X_i$.

5. The combination as set forth in claim 1 wherein said N periods are successive periods and further including means responsive to said input signal for determining a value T corresponding to the length of all N successive periods plus a portion of the next following period of said input signal and wherein said means for determining values $x_i$ also determines the value U corresponding to said portion of the next following period and wherein the combination further includes means for performing the calculation $(T - U) \div N$ for determining the average period of said alternating signal.

6. A method for determining from any input alternating signal having N periods whether said signal has portions consisting essentially of an alternating signal of substantially uniform period, wherein N is an integer greater than 1, comprising the steps of:
    (a) determining the N values, $X_i$, corresponding to the periods of N successive cycles of said input signal where $I = 1, 2 \ldots N$;
    (b) computing the value of Y corresponding to the variance of said N values of $X_i$;
    (c) comparing said value Y with a preselected value Z representing the maximum variance of said uniform period alternating signal for producing a first indication indicative of Z being the greater number manifesting thereby that said input signal consists essentially of an alternating signal of substantially uniform period and for producing a second indication indicative of Y being the greater number manifesting thereby that said input signal does not consist essentially of said substantially uniform period signal.

* * * * *